Oct. 21, 1969  F. BASTOW  3,473,814
SEALS
Filed July 31, 1967

INVENTOR
FRANK BASTOW
BY
ATTORNEYS

United States Patent Office 3,473,814
Patented Oct. 21, 1969

3,473,814
SEALS
Frank Bastow, Cheltenham, England, assignor to Dowty Seals Limited, Ashchurch, Tewkesbury, England, a British company
Filed July 31, 1967, Ser. No. 657,149
Claims priority, application Great Britain, Aug. 5, 1966, 35,255/66
Int. Cl. F16j 9/08, 15/32
U.S. Cl. 277—188     3 Claims

ABSTRACT OF THE DISCLOSURE

A seal primarily for a double-acting piston and cylinder comprises a resilient sealing ring having an obtuse-angled sealing lip, and on each side thereof obtuse-angled shoulders which are complementally engaged by axial and radial flanges of a backing ring, said backing ring including a tubular portion which extends axially from the junction of the axial and radial flanges and which constitutes a bearing for the piston in the cylinder.

BACKGROUND OF THE INVENTION

Field of the invention

Seals for mounting in one member and sealing against a cylindrical surface of a relatively slidable member under fluid pressure acting in each direction.

Description of the prior art

A double-acting piston seal is known comprising a centrally thickened sealing portion and two outer portions reinforced with fabric to prevent extrusion which together with backing rings at each end are a close fit in a mounting recess, each backing ring including an axial flange which forms a piston bearing.

In another proposal, an O-ring with two complementally engaging backing rings are mounted in an annular recess with overall axial clearance, each backing ring having a short and comparatively stiff lip intended to prevent extrusion.

In the one case, composite rings with fabric reinforcement are not simple to manufacture, and in use they are liable to break down at the boundary between the reinforced and un-reinforced portions. In the other case, due to manufacturing tolerances, it is difficult to prevent extrusion at the outer diameter without incurring the risk of extrusion between the backing ring and the base of the mounting recess. Moreover, an O-ring is liable to roll and twist into an irregular section, causing uneven wear and leakage.

SUMMARY OF THE INVENTION

A seal comprises an intermediate ring of rubber or of a rubber-like material, and two backing rings of a material which is harder than the material of the intermediate ring, the intermediate ring being of a generally pentagonal cross-section having one side, formed by the base of the ring, which is substantially longer than each of the other sides, having an apex at each end of the longest side of an angle which does not exceed a right angle, and having obtuse angles at each of the other three apices of which the intermediate apex forms a sealing lip and the other two apices form shoulders, and each backing ring including a radial flange and an axial flange shaped for complemental engagement with parts of the sides forming one of the shoulders.

DESCRIPTION OF THE PREFERRED EMBODIMENT

Figure 1:
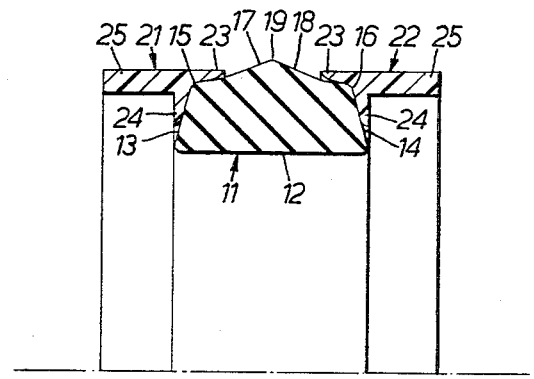
FIGURE 1 shows a section through a seal in accordance with an embodiment of the invention.

The seal includes a resilient intermediate ring 11 of rubber or of a rubber-like material, which in its free state is of generally pentagonal cross-section. A cylindrical base surface 12 at the inner diameter of the ring forms the longest side of the pentagon. Opposite end surfaces 13 and 14 are equally inclined to the base surface at an acute angle which is somewhat less than a right angle, for example 70° or thereabouts, the apex being rounded. Two outer surfaces 17 and 18 of the ring meet the end surfaces 13 and 14 respectively at apices which are rounded to form shoulders 15 and 16, the surfaces meeting at each shoulder being mutually inclined at an obtuse angle. The outer surfaces 17 and 18 meet at a relatively sharp-edged apex 19, at an angle of approximately 140°, to form a sealing lip which is at the centre of the ring 11. The radial depth of the ring between the apex or sealing lip 19 and the base surface 12 is approximately half the length of the base surface 12. The length of each of the sides 13, 14, 17 and 18 is approximately half the length of the base surface 12.

The intermediate ring 11 is symmetrical about a central transverse plane, and two similar rings 21 and 22 are provided. Each backing ring includes an axial flange 23 and an inwardly directed radial flange 24. Each flange is tapered towards its outer end from its junction with the other flange, so that the surfaces forming the angle contained between the flanges complementally engage the shoulder 15 or 16, these surfaces being curved away from the intermediate ring 11 at the tips of the flanges 23 and 24. The flanges extend only over a part of the sides which meet at the shoulder.

Each backing ring includes a tubular portion 25 extending axially from the junction of the radial and axial flanges, this portion 25 together with the axial flange having a common outer cylindrical surface.

Figure 2:
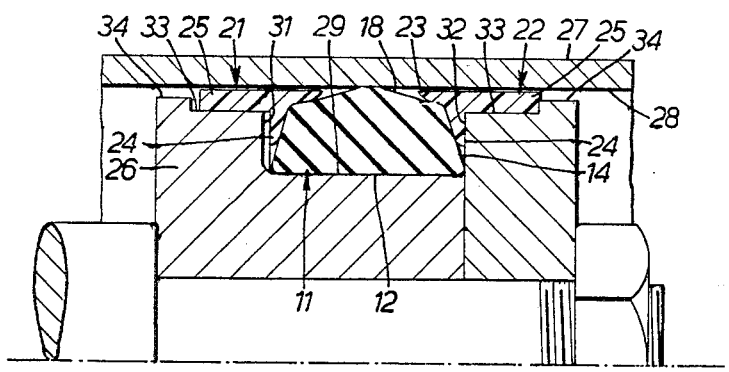
FIGURE 2 shows a section through the seal when assembled between two members to be sealed.

The seal is shown in FIGURE 2 mounted in a piston 26 which is slidable in the bore 28 of a cylinder 27 under the application of fluid pressure at one end or the other end. The piston 26, which is formed in two parts for ease of assembly of the sealing device, provides an annular recess having a cylindrical base surface 29 which is engaged by the base 12 of the sealing ring 11, and two transverse end surfaces 31 and 32 which are engageable by the radial flanges 24 of the backing rings 21 and 22. A rectangular rebate 33 of greater axial length than radial depth is formed between each end surface 31 or 32 and the periphery of the piston to locate the tubular portion 25 of a backing ring which constitutes a bearing sleeve. The periphery 34 of the piston is spaced from the bore 28, but the outer cylindrical surfaces of the backing rings slidably engage the bore to support the piston therein.

The radial depth of the intermediate ring 11 in its free state slightly exceeds the radial depth between the bore 28 and the base surface 29, whereby the sealing lip 19 is compressed on assembly. The assembly of backing rings 21, 22 and the intermediate ring 11 have an over-all axial clearance within the recess as seen at the left hand side in FIGURE 2. The sliding engagement of each backing ring 21, 22 in the bore 28 and in the rebate 33 is sufficiently free to permit the access of fluid pressure from one end or the other of the piston along the sliding surface to the corresponding end of the intermediate ring.

If, for example, fluid pressure at the left hand end of the piston 26 exceeds that at the right hand end, the intermediate ring 11, which is of relatively soft resilient material without internal reinforcement, will readily deform to fill the gap between the end surface 14 of the ring and the end surface 32 of the recess beyond the flange 24, and to fill the gap between the outer surface 18 of the ring and the bore 28 beyond the flange 23. The flanges 23 and 24, due to their tapered form, have sufficient flexibility to deflect into close engagement with the bore 28 and the end surface 24 and so prevent extrusion of the sealing ring. The tubular portion 25 of the backing ring 22 is of sufficient length to provide an adequate bearing surface against the bore 28 and to resist the longitudinal shear force due to fluid pressure on that part of the backing ring 22 which projects radially beyond the periphery of the piston 26.

Upon a reversal of fluid pressure, the fluid pressure previously acting on the left hand end of the intermediate ring 11 is readily relieved along the sliding clearances of the tubular portion 25 of the backing ring 21, while the higher pressure at the right hand end has access to the right hand end of the ring 11 to act in a manner similar to that described. Thus, the sealing pressure of the ring 11, which is initially low, increases in proportion to the fluid pressure difference.

Due to the shape of the ring 11, it can swell through absorption of hydraulic fluid without completely closing the clearance gaps beyond the ends of the backing ring flanges 23 and 24, and the over-all axial clearance within the recess.

It will be seen from FIGURE 2 that, due to the taper and the curved tips of the flanges 23 and 24, the deformation of the intermediate ring 11 under fluid pressure is slight, and that the ring will therefore recover its original shape upon removal of fluid pressure, without any portion thereof remaining trapped underneath or behind the radial backing ring flanges.

I claim:
1. A seal comprising
    (a) an intermediate ring of sealing material having a generally pentagonal cross-section defined by
        (1) one side, formed by the base surface of the ring, which is substantially longer than each of the other sides,
        (2) two sides formed by opposite end surfaces of the ring, each of which is inclined to the base surface at an included angle which is less than a right angle, and
        (3) two further sides, formed by outer surfaces of the ring, which are mutually inclined to form an obtuse-angled sealing lip, each outer-surface being inclined to the adjacent-end surface at an obtuse angle, and together with said end surface forming a shoulder, and
    (b) two backing rings which, in use, are arranged one at each end of the intermediate ring, each backing ring including
        (1) a tapered radial flange extending from the shoulder, at the corresponding end of the intermediate ring, over a part only of the inclined end surface of the intermediate ring, and
        (2) a tapered axial flange extending from the shoulder at said end over a part only of the inclined outer surface of the intermediate ring.
2. A seal comprising
    (a) an intermediate ring of sealing material having a generally pentagonal cross-section defined by
        (1) one side, formed by the base surface of the ring, which is substantially longer than each of the other sides,
        (2) two sides formed by opposite end surfaces of the ring, each of which is inclined to the base surface at an included angle which is less than a right angle, and
        (3) two further sides, formed by outer surfaces of the ring, which are mutually inclined to form an obtuse-angled sealing lip, each outer-surface being inclined to the adjacent-end surface at an obtuse angle, and together with said end surface forming a shoulder, and
    (b) two backing rings which, in use, are arranged one at each end of the intermediate ring, each backing ring including
        (1) a tapered radial flange extending from the shoulder, at the corresponding end of the intermediate ring, over a part only of the inclined end surface of the intermediate ring,
        (2) a tapered axial flange extending from the shoulder at said end over a part only of the inclined outer surface of the intermediate ring, and
        (3) a tubular portion extending axially from junction of the radial and axial flanges, said tubular portion forming, when the seal is in use between two members, a bearing sleeve which is located on one member and which with the sealing lip slidably engages the other member.
3. A device for establishing a seal between one member and the cylindrical surface of another member with respect to which said one member is slidable, comprising:
    (a) an annular recess formed in said one member, said annular recess having
        (1) a cylindrical base,
        (2) two transverse end walls, the radial depth of which is small compared with the length of the base, and
        (3) a rectangular rebate of greater axial length than radial depth formed in each end wall remote from the cylindrical base,
    (b) an intermediate ring of resilient material having a generally pentagonal cross-section defined by
        (1) one side which is formed by the base surface of the ring, said base surface engaging the base of the recess,
        (2) two sides which are formed by opposite end surfaces of the ring, each of which is inclined to the base surface so as to provide a tapering gap between the end surface and the adjacent end wall of the recess, and
        (3) two further sides which are formed by outer surfaces of the ring, mutually inclined to form an obtuse-angled sealing lip which compressively engages said cylindrical surface, each outer surface being inclined to the adjacent end surface at an obtuse angle, and together with said end surface forming a shoulder, and
    (c) two backing rings disposed one at each end of the intermediate ring, each backing ring including
        (1) a tapered radial flange extending from the shoulder at the corresponding end of the intermediate ring over a part only of the gap between the end surface and the adjacent end wall,
        (2) a tapered axial flange extending from the shoulder at said one end over a part only of the inclined outer surface of the intermediate ring, and
        (3) a tubular bearing portion extending axially from the junction of the radial and axial flanges into the rectangular rebate at said one end.

References Cited

UNITED STATES PATENTS 2,757,994 8/1956 Snyder _____ 277—188
3,186,702 6/1965 Taylor _____ 277—188 X

FOREIGN PATENTS 1,193,987 5/1959 France.

SAMUEL ROTHBERG, Primary Examiner

U.S. Cl. X.R.

277—176